United States Patent [19]

Chen

[11] Patent Number: 5,345,305
[45] Date of Patent: Sep. 6, 1994

[54] AQUARIUM LIGHT METER

[76] Inventor: Chi-Der Chen, No. 1-4, Lane 147, Hsia-Men ST., Taipei, Taiwan

[21] Appl. No.: 51,158

[22] Filed: Apr. 22, 1993

[51] Int. Cl.5 .................................................. G01J 1/42
[52] U.S. Cl. ...................... 356/221; 356/213; 356/432; 250/227.11
[58] Field of Search ............... 356/213, 218, 221, 219, 356/226, 432, 436; 250/227.11, 227.28, 227.31, 227.25; 43/4, 4.5; 385/8, 12; 119/266, 267

[56] References Cited

U.S. PATENT DOCUMENTS

| | | | |
|---|---|---|---|
| 2,542,299 | 2/1951 | Archer et al. | 356/226 |
| 3,873,215 | 3/1975 | Quinlan | 356/218 |
| 4,264,211 | 4/1981 | Biggs | 356/213 |

FOREIGN PATENT DOCUMENTS 0037527 3/1983 Japan ................................ 356/218

*Primary Examiner*—Davis L. Willis
*Assistant Examiner*—Hoa Q. Pham
*Attorney, Agent, or Firm*—Ladas & Parry

[57] ABSTRACT

This invention relates to an aquarium light meter including a light sensing device, a pivotal assembly connecting the light sensing device to a pair of telescopic tubes, a controller, and a signal wire connected to the light sensing device and passing through the pivotal assembly and telescopic tubes for connection to the controller. The aquarium light meter is adjustable in length and direction of light detection in accordance with the shape of the aquarium and the location of ornaments therein so that the light intensity at any predetermined portions of the aquarium can be precisely detected.

7 Claims, 4 Drawing Sheets

AQUARIUM LIGHT METER

BACKGROUND OF THE INVENTION

The present invention is related to a light meter for detecting light intensity, particularly a telescopic, waterproof light meter adapted to be used in an aquarium. The aquarium light meter in accordance with the present invention may be used at various depth to precisely detect the intensity of a light source which penetrates through the water.

Conventional light meters must be placed in a location where they are directly exposed to the light. However, in some applications, it is rather difficult to use the conventional light meters to determine whether the light intensity of a specific environment is appropriate. For example, an aquiculturist has to make sure that the light intensity for the aquatic plants, such as water plants or seaweed, is sufficient for their growth. For water plants, the light intensity should be about 80–200 F.C. (Foot Candles, for seaweed about 1,000–2,000 F.C., and for coral 1,500–2,000 F.C.

To date, no light meter can be placed in the water, or placed at various locations and depths of an aquarium to detect the light intensity exposed on the aquatic plants. Therefore, the aquiculturist has to adjust the light intensity based on visual judgment and personal working experience. Nevertheless, such judgment is unreliable. If the light intensity is too high, harm may be done to the fish. If the light intensity is too low, the photosynthesis of the aquatic plants will be adversely affected, thereby jeopardizing the growth of the plants.

SUMMARY OF THE INVENTION

The primary object of the present invention is to provide a waterproof light meter which can be placed in the water to detect the intensity of the light emitted from a light source.

Another object of the invention is to provide a light meter which is adjustable in length and direction of light detection in accordance with the shape of the aquarium and the locations of the ornaments therein, so that the light intensity at any predetermined portions of the aquarium can be precisely detected.

These and other objects, advantages and features of the present invention will be more fully understood and appreciated by reference to the drawings and detailed description hereafter.

DETAILED DESCRIPTION OF THE INVENTION

Figure 1:
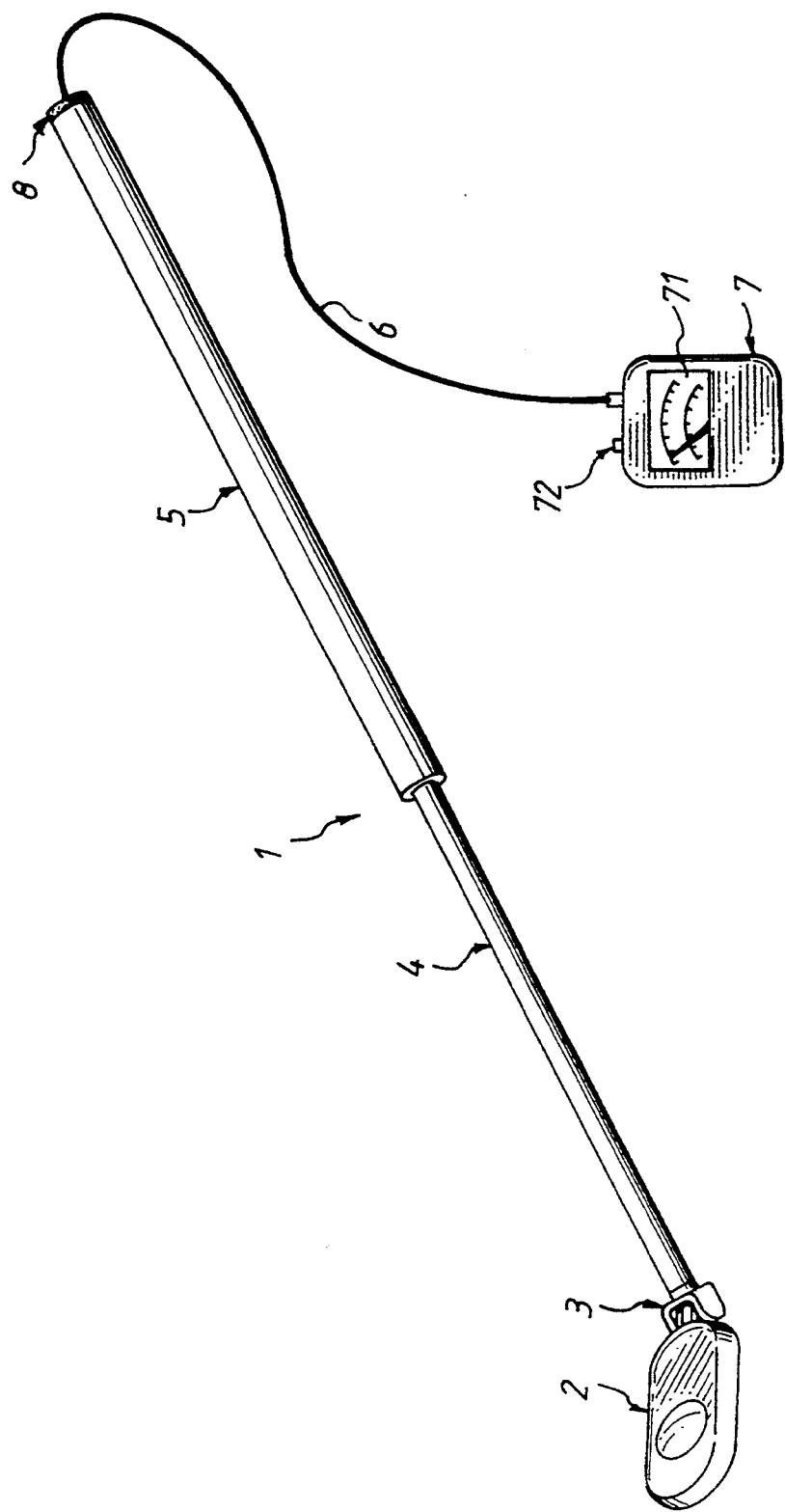
FIG. 1 is a perspective view of an aquarium light meter in accordance with the present invention.
Figure 2:
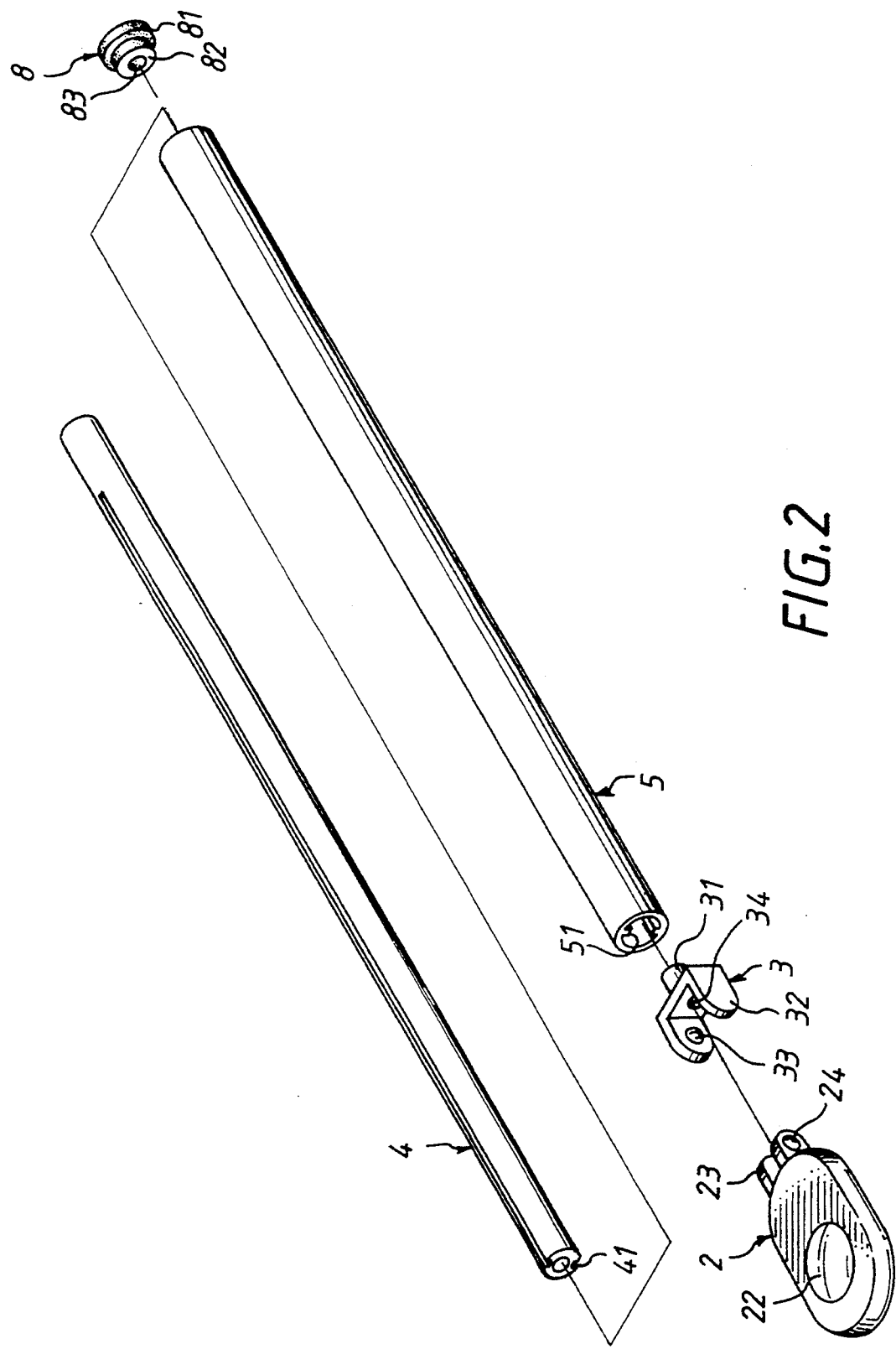
FIG. 2 is an exploded view of the aquarium light meter without its controller and signal wire.

With reference to FIGS. 1 and 2, the aquarium light meter according to the present invention is primarily composed of a light sensing device (2), a pivotal means (3), a telescopic inner tube (4), an exterior tube (5), a light sensing signal wire (6), a controller (7) and a tube cover (8).

Figure 3:
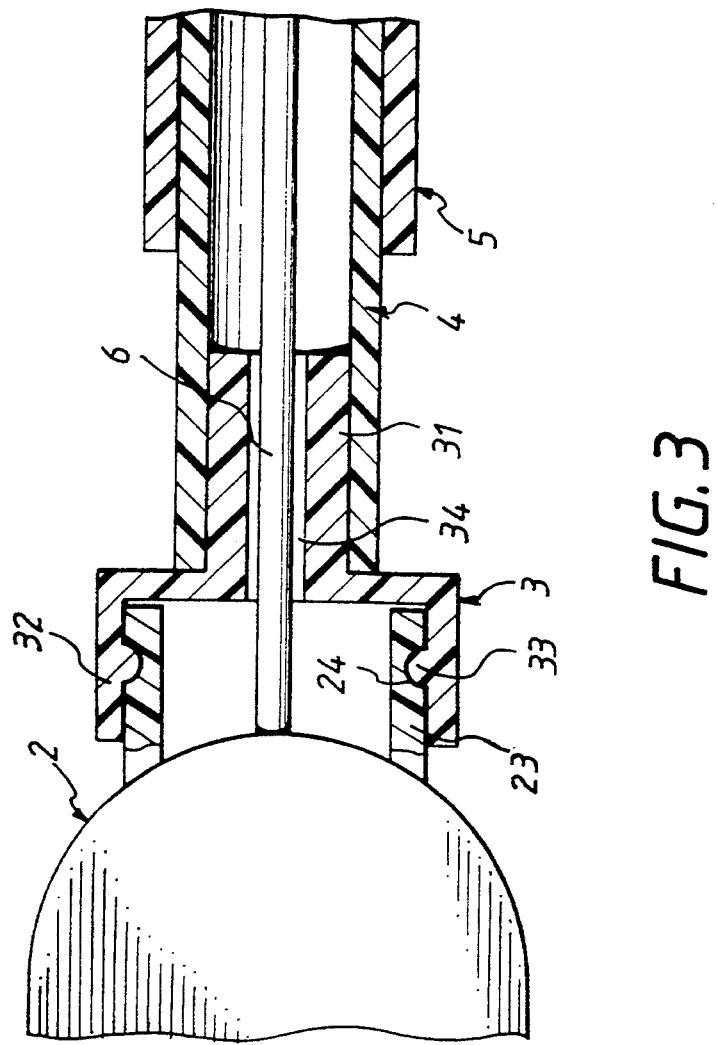
FIG. 3 is an enlarged, cross-sectional view of the pivotal means connecting the light sensor and the tubes.
Figure 5:
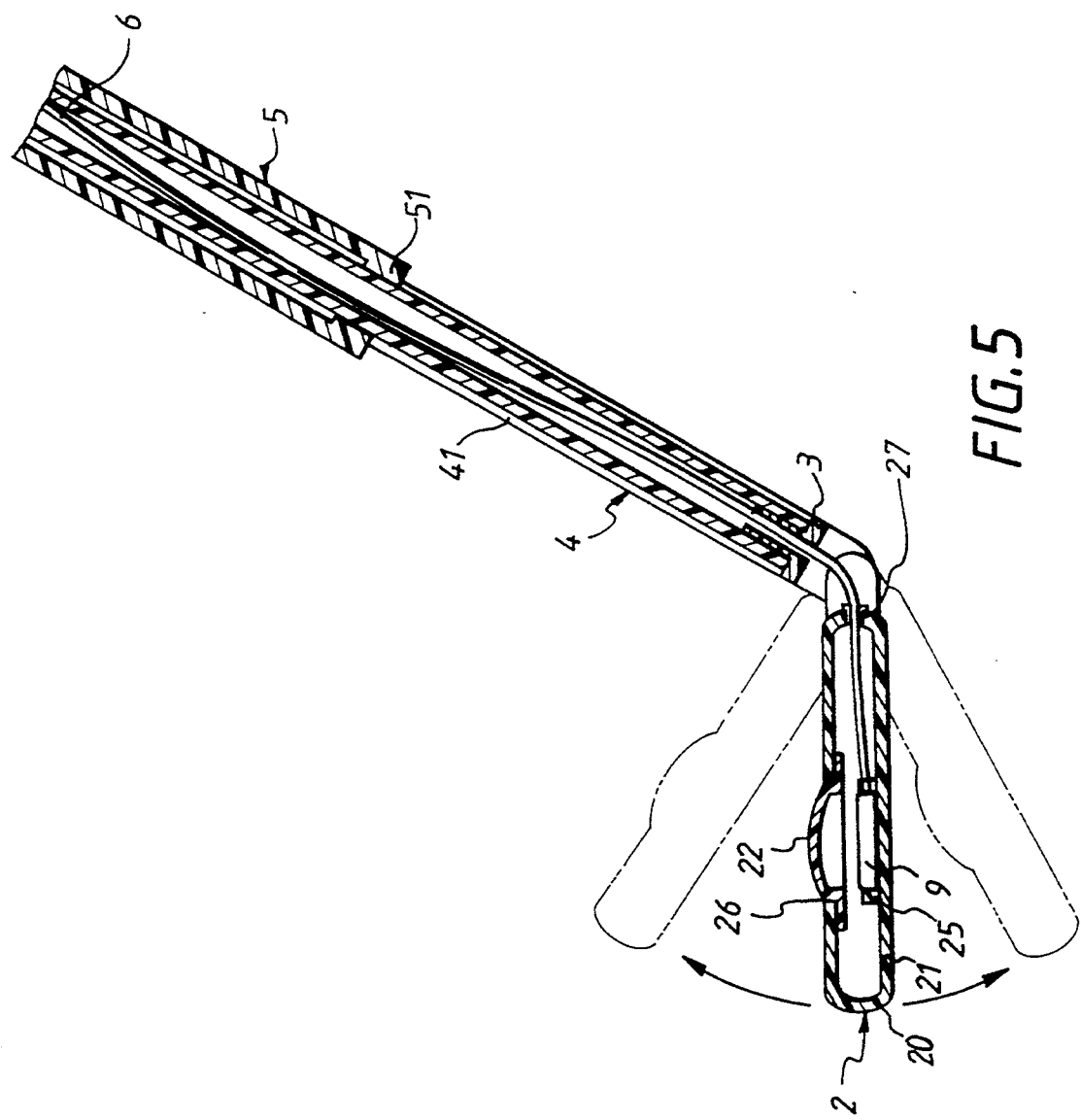
FIG. 5 shows the pivotal operation of the light sensing device in use.

With reference to FIGS. 3 and 5, the light sensing device (2) may be flat rectangular, flat elliptical or any appropriate shape. The sensing device (2) comprises a housing (20), a base cover (21), a transparent zoom lens (22), and a light sensor (9). The upper portion of the housing (20) is provided with a circular opening (26). The base of the transparent zoom lens (22) is provided with a flange and is fitted within the opening (26). The base cover (21) is attached to the bottom of the housing (20), and the interior portion thereof which faces the opening (26) is provided with a plurality of positioning protrusions (25). The light sensor (9) is adapted to be adhered and placed between the protrusions (25) so as to receive the light beam collected by the transparent zoom lens (22).

One end of the housing (20) includes a pair of lugs (23). The center portion of the outside surface of each lug (23) has a recess (24) which cooperates with the pivotal means (3). The housing (20) is provided with a hole (27) between the two lugs (23) such that the signal wire (6) can be inserted therethrough. When the light sensing device (2) is assembled, an appropriate amount of waterproof adhesive material should be applied to the portion defined between the housing (20) and the base cover (21), along the hole (27) through which the signal wire (6) is inserted, and along the periphery of the transparent zoom lens (22).

The pivotal means (3) includes a guide tube (31) adapted to be fitted snugly into the hole of the telescopic inner tube (4), and is provided with an hole (34) through which the signal wire (6) may pass. The pivotal means (3) further includes a pair of lugs (32) disposed opposite to the guide tube (31). The distance between the two lugs (32) measured from inside is approximately equal to the distance between the housing lugs (23) measured from the outside. Each of the lugs (32) has a protrusion (33) at the center of its inner surface. The protrusions (33) fit within the recesses (24) of the housing lugs (23).

Figure 4:
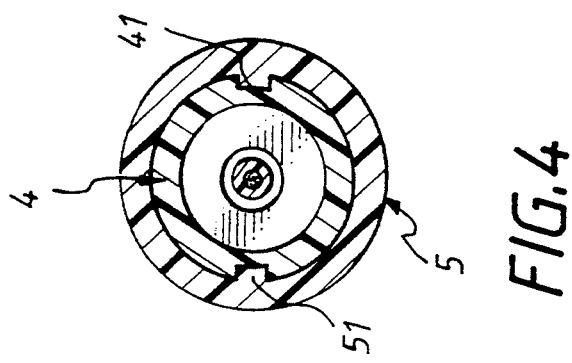
FIG. 4 is a cross-sectional view of the telescopic tubes taken along line 4—4 in FIG. 3.

As shown in FIGS. 1, 2 and 4, the telescopic inner tube (4) fits into the hole of the exterior tube (5) in a slidable manner. The inner tube (4) is about 3 centimeters (cm) longer than the exterior tube (5). Therefore, even in a collapsed position, the inner tube (4) extends a distance of 3 cm outside the exterior tube (5) so that the user may have a good grip on the tube 4. Additionally, the inner tube (4) is provided with two grooves (41) symmetrically arranged at the periphery thereof. The grooves (41) terminate at a short distance from the head end of the inner tube (4). Two guide ribs (51) are symmetrically arranged at the inner surface of one end of the exterior tube (5). During the telescopic operation, the guide ribs (51) serve for guiding the inner tube (4) in sliding linearly without rotation, and cooperate with the grooves (41) to achieve a positioning effect.

The tube cover (8) is made of a resilient material such as rubber. The cover (8) comprises a circular flange (81), an insert portion (82) which may fit into the hole of the exterior tube (5), and a circular hole (83) through which the signal wire (6) can pass.

The controller (7) has a two-step light meter (71), a switch (72), a light sensor signal transformation circuit, (not shown) and a housing which positions the aforesaid components. When the aquarium light meter is assembled, one end of the signal wire (6), which is connected to the light sensor (9), passes through the pivotal means (3), inner tube (4), exterior tube (5) and tube cover (8), to connect with the signal transformation circuit of the controller (7). The light meter (71) has two steps, that is 0–500 F.C. and 500–5,000 F.C. The 0–500 F.C. range is intended for the detection of low density light such as fluorescent lamps, while the 500–5,000 F.C. range is for the detection of light of relatively higher density, such the solar light and metallic halogen lamps. The two-step light meter effects the transformation and selection of the desired range by means of the switch (72).

The two-step light meter (71) is especially useful for the detection of the light density within an aquarium. When the light sensing device (2) is placed right below the light source, the switch (72) is adjusted to the step where high density light may be detected. In this way, the reading of the light intensity may be readily obtained. When the light meter is used to detect the light intensity at the bottom or other portions of the aquarium, the switch (72) should be adjusted to the step where low density light may be detected since the light intensity at those locations will normally be reduced to below 500 F.C. due to the water and ornaments. Consequently, the light intensity of any portions of the aquarium may be readily detected in a precise manner.

According to a preferred embodiment of the present invention, the inner and exterior tubes are preferably made of plastic material of high flexibility and corrosion resistance. Furthermore, the preferable length of the inner tube (4) is in the range of 70 to 75 cm, while the exterior tube is about 3 cm shorter than the inner tube.

Although an exemplary embodiment of the invention has been shown and described, many changes, modifications and substitutions may be made by one having ordinary skill in the art without necessarily departing from the spirit and scope of this invention.

| NUMERAL REFERENCES | |
|---|---|
| 1. Aquarium Light Meter | 2. Light Sensing Device |
| 3. Pivotal Means | 4. Telescopic Inner Tube |
| 5. Exterior Tube | 6. Signal Wire |
| 7. Controller | 8. Tube Cover |
| 9. Light Sensor | 20. Housing |
| 21. Base Cover | 22. Transparent Zoom Lens |
| 23. Lug | 24. Recess |
| 25. Protrusion | 26. Circular Opening |
| 27. Hole | 31. Guide Tube |
| 32. Lug | 33. Protrusion |
| 34. Hole | 41. Groove |
| 51. Guide Rib | 71. Light Meter |
| 72. Switch | 81. Circular Flange |
| 82. Insert Portion | 83. Circular Hole |

I claim:

1. An aquarium light meter comprising:

a light sensing device having a housing, a base cover, a transparent lens, and a light sensor; said housing having one end with a pair of lugs thereat, said housing having an upper wall provided with a circular opening, said transparent lens being fitted within said opening, said light sensor being adhered onto an interior surface of said base cover, said base cover being connected to said housing to seal said light sensing device;

a pivotal means including a guide tube, having a pair of lugs at one end, said guide tube being provided with a hole;

a telescopic tube assembly including an inner tube and an exterior tube;

a tube cover having a central hole fitted over a front end of said exterior tube;

a controller having a two-step light meter, a two-step switch, and a housing; and a signal wire having one end connected to said light sensor and passing through said housing of said light sensing device, said pivotal means, said telescopic tube assembly, and said tube cover, an opposite end of said signal wire being connected to said controller;

said light sensor being axially aligned with said lens, an appropriate amount of waterproof adhesive material being applied within said housing of said light sensing device, at a juncture between said lens and said base cover, and at a portion of said housing through which said signal wire passes; a distance between said lugs of said housing measured from outside being approximately equal to a distance between said lugs of said pivotal means measured from inside, a center portion of an outer surface of each housing lug having a recess, a center portion of an inner surface of each lug of said pivot means including a protrusion which pivotally engages in a respective said recess; said guide tube of said pivotal means being fitted snugly into the hole in said inner tube, said inner tube being fitted into the hole of said exterior tube in a slidable manner, said inner tube being provided with two grooves symmetrically arranged at a periphery thereof which terminate at a short distance from a front end of said inner tube; two guide ribs symmetrically arranged at an inner surface of a remote end of said exterior tube so that as said inner and exterior tubes are assembled, the guide ribs guide said inner tube to slide linearly without rotation, and cooperate with said grooves to achieve a positioning effect.

2. The aquarium light meter as claimed in claim 1, wherein an inner surface of said base cover of said light sensing device is provided with a plurality of positioning protrusions to facilitate the precise positioning of said light sensor.

3. The aquarium light meter as claimed in claim 1, wherein said inner tube is slightly longer than said exterior tube.

4. The aquarium light meter as claimed in claim 3, wherein the length of said inner tube is in the range of 70 to 75 centimeters.

5. The aquarium light meter as claimed in claim 1, wherein said housing, base cover, and pivotal means are formed of non-conductive, flexible plastic material.

6. The aquarium light meter as claimed in claim 1, wherein said inner and exterior tubes are formed of plastic material with high flexibility.

7. The aquarium light meter as claimed in claim wherein said tube cover is made of flexible rubber material.

* * * * *